March 29, 1927.
L. HOFMEISTER
AUTOBOGGAN
Filed Feb. 19, 1926
1,622,719
2 Sheets-Sheet 1
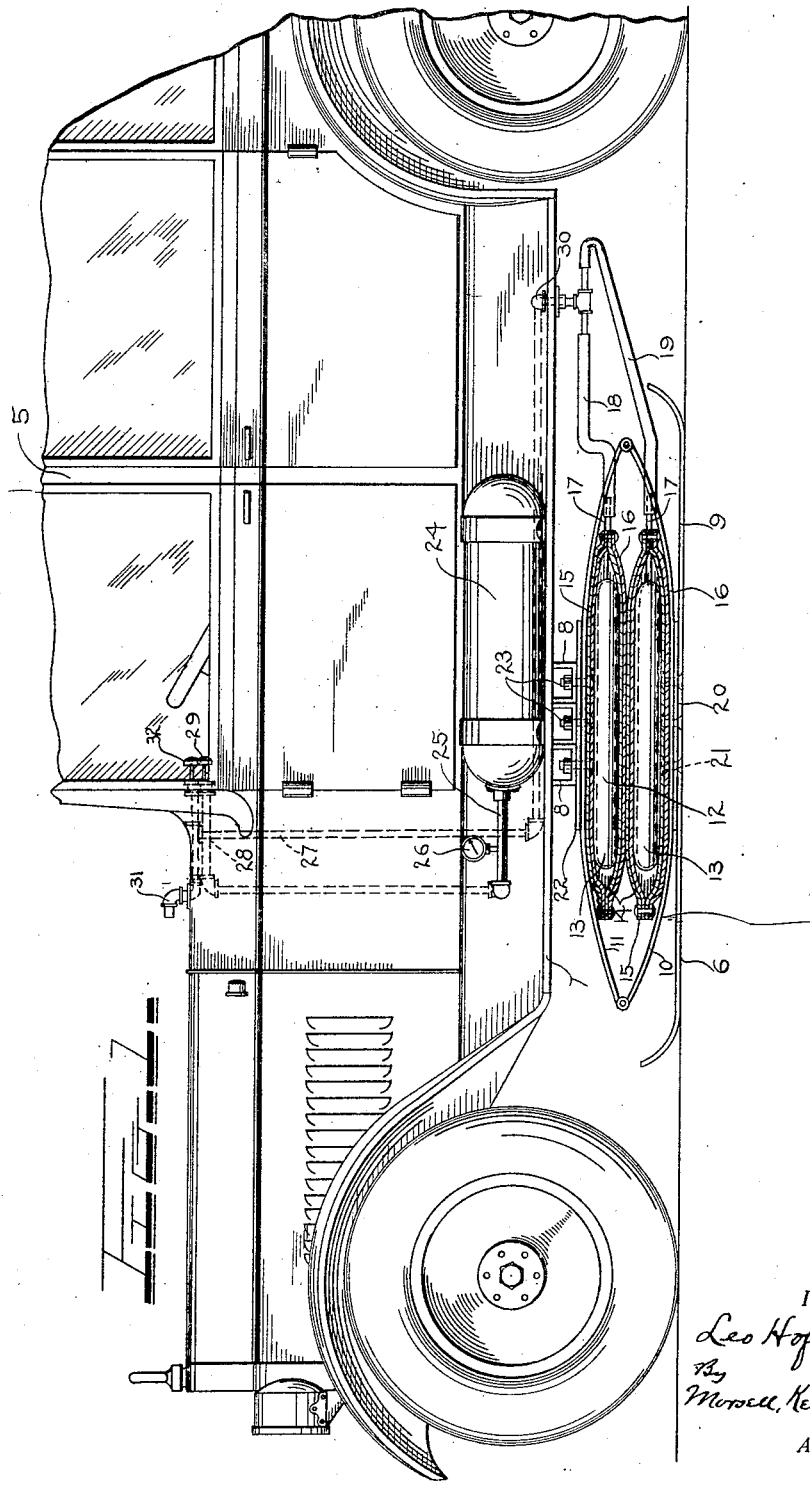
INVENTOR.
Leo Hofmeister
By
Morrell, Keeney & Morrell
ATTORNEYS.

March 29, 1927.
L. HOFMEISTER
AUTOBOGGAN
Filed Feb. 19, 1926
1,622,719
2 Sheets-Sheet 2
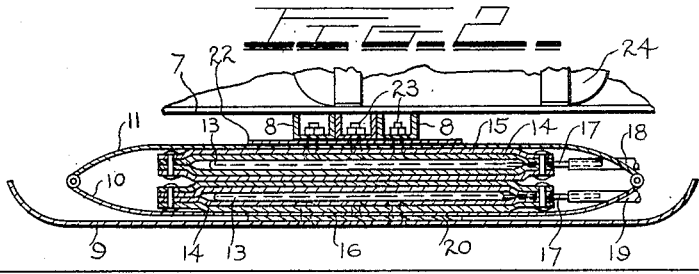
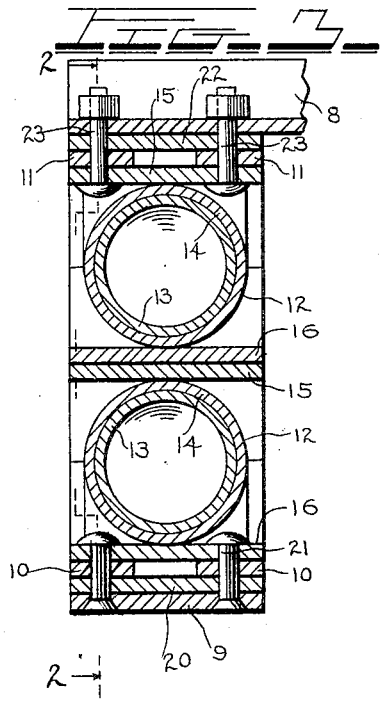
INVENTOR.
Leo Hofmeister
BY
Morsell, Keeney & Morsell
ATTORNEYS.

Patented Mar. 29, 1927.

1,622,719

UNITED STATES PATENT OFFICE.

LEO HOFMEISTER, OF MILWAUKEE, WISCONSIN.

AUTOBOGGAN.

Application filed February 19, 1926. Serial No. 89,371.

This invention relates to improvements in autoboggans.

It is one of the objects of the present invention to provide a toboggan attachment for motor vehicles which will increase their efficiency and comfort in travel over snow covered roads.

A further object of the invention is to provide motor vehicle sled attachments with which a motor vehicle of any character may be easily equipped.

A further object of the invention is to provide a device of the class described which will materially increase the tractive power of the vehicle's driving wheels by taking approximately sixty percent of the weight of the vehicle off of all of the wheels.

A further object of the invention is to provide motor vehicle sled attachments which will greatly increase the riding comfort of a vehicle equipped with the same and lessen the bumps and jars translated to the body.

A further object of the invention is to provide attachments of the class described which will prevent a vehicle from skidding or side-swaying when driving through snow.

A further object of the invention is to provide sled attachments for motor vehicles which may be automatically lowered to or raised from operative position, the controls being conveniently located on the dash of the vehicle.

A further object of the invention is to provide autoboggans which are of very simple construction, are easily operated, are strong and durable, and are well adapted for the purposes described.

With the above and other objects in view the invention consists of the improved toboggan attachment and its parts and combinations as set forth in the claims, and all equivalents thereof.

In the accompanying drawing in which the same reference characters indicate the same parts in all of the views:

Fig. 1 is a side view of an automobile equipped with the improved autoboggan, the same being shown in operative position and parts being shown in section;

Fig. 2 is a fragmentary view of an automobile showing the autoboggan in raised or inoperative position, the autoboggan being shown in vertical section, the line of section being indicated at 2—2 in Fig. 3; and Fig. 3 is a cross sectional view of the autoboggan on a larger scale.

Referring now more particularly to the drawings, it will appear that the numeral 5 indicates a motor vehicle equipped with the improved autoboggans 6, one of which is secured under each running board 7, as shown in Fig. 1, by means of curved, transverse U brackets 8.

The autoboggan proper includes an elongated sled or toboggan member 9 for sliding engagement with the road being traveled over and mounted on the member 9 are springs 10 and 11, there being a pair of spaced apart upper springs, and a pair of spaced apart lower springs connected together at their ends. The springs are bent so that they will normally contract toward each other and when expanded away from each other the tendency is for the springs to flatten together.

Confined between the springs are a pair of elongated pneumatic cushion members 12 and as shown particularly in Fig. 3 each cushion member includes an elongated inner tube 13 adapted for inflation, protected by a canvas casing 14. Each cushion member is protected against wear and friction by an upper metallic plate 15 and a lower metallic plate 16. Each pair of upper and lower plates are secured together at their end portions, the ends of the canvas casings being interposed therebetween.

A nozzle 17 for inflation is vulcanized into an end portion of each tube 13 and the same extend outwardly through the casings and plate ends as shown. Tubular connections 18 and 19 are carried by the nozzles and extend between the springs 10 and 11.

Interposed between the lower springs 10 and the toboggan member 9 is a plate 20 and the plate 16, the springs, the plate 20 and toboggan member are held together by bolts 21, the lower ends of the bolts being countersunk into the member 9, as shown in Fig. 3. An upper plate 22 is interposed between the upper springs 11 and the brackets 8 to strengthen the brackets and hold them together and the brackets, plate 22, springs 11, and plate 15 are held together by bolts 23.

A compressed air tank 24, supplied with air by a motor operated pump (not shown), is located on the running board 7 of the vehicle. A pipe line 25 extends from the tank and the same is fitted with a reduction valve (not shown) and a pressure gage 26.

The pipe line 25 extends upwardly through the cowl portion of the vehicle and intersects another pipe line 27, a valve being located at the point of intersection, as 28, and controlled by a handle 29 extending inwardly from the dash board of the vehicle and easily accessible from the driver's seat.

As shown in Fig. 1, the pipe line 27 extends from a coupling 30, mounted through the running board, and said coupling is of bifurcated form to receive both of the connections 18 and 19 which join the inner tubes. The outer end of the pipe line 27 terminates at an exhaust portion 31 located wherever desired and said exhaust is controlled by a valve operated by a handle 32 positioned adjacent the handle 29.

Normally, the autoboggan is in the raised or contracted position shown in Fig. 2, adjacent the undersurface of the running board and above the ground. If it is desired to lower the autoboggan to operative position, it may be quickly accomplished by the driver of the vehicle. The valve controlling the exhaust is closed and the valve located at the intersection 28 is opened. Air from the tank 24 will then flow through the pipes 25 and 27 and connections 18 and 19 to the inner tubes 12 to inflate the same to the desired pressure. The inflation of the tubes will expand the springs and cause the sled member 9 to settle against the ground and the same will provide a resilient support for the vehicle, assuming a great portion of its weight.

To release or raise the autoboggan it is merely necessary to open the valve of the exhaust and close the valve of the pipe 25. The air will then escape from the tubes through the pipe 27 and out of the exhaust. As the tubes contract, the tension of the springs will fold the device together to the inoperative position shown in Fig. 2.

From the foregoing description, it will be seen that the improved autoboggan is of very simple and novel construction, and is well adapted for the purposes set forth.

What I claim as my invention is:

1. In combination with a vehicle, a yielding toboggan member mounted under the vehicle body, compressed air means for moving said toboggan member to operative position, and spring means for returning the toboggan member to inoperative position.

2. In combination with a vehicle, a pneumatic toboggan member mounted under the vehicle body, and compressed air controlled means for moving said member to and from operative position.

3. In combination with a vehicle, a toboggan member, a pair of opposed springs interposed between the toboggan member and the vehicle body, and means interposed between said springs for flexing or contracting the springs with respect to each other.

4. In combination with a wheeled motor vehicle, a toboggan member, springs interposed between the toboggan member and the vehicle body, the springs being positioned so as to be yieldingly separated, pneumatic members interposed between said springs to yieldingly separate the same and lower the toboggan member with respect to the vehicle body, and means for inflating and deflating said pneumatic members.

In testimony whereof, I affix my signature.

LEO HOFMEISTER.